(12) United States Patent
Sakata

(10) Patent No.: US 8,937,740 B2
(45) Date of Patent: Jan. 20, 2015

(54) PRINTING APPARATUS, PRINTING APPARATUS CONTROL METHOD, AND STORAGE MEDIUM

(71) Applicant: Canon Kabushiki Kaisha, Tokyo (JP)

(72) Inventor: Munetaka Sakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/860,011

(22) Filed: Apr. 10, 2013

(65) Prior Publication Data

US 2013/0271785 A1 Oct. 17, 2013

(30) Foreign Application Priority Data

Apr. 12, 2012 (JP) ................................ 2012-091139

(51) Int. Cl.
| | | |
|---|---|---|
| *G06F 15/00* | (2006.01) | |
| *G06K 15/00* | (2006.01) | |
| *B41J 11/00* | (2006.01) | |
| *B41J 11/48* | (2006.01) | |
| *B41J 13/10* | (2006.01) | |
| *G06K 15/02* | (2006.01) | |
| *G03G 15/00* | (2006.01) | |

(52) U.S. Cl.
CPC ......... *G06K 15/4065* (2013.01); *B41J 11/0075* (2013.01); *B41J 11/485* (2013.01); *B41J 13/103* (2013.01); *G06K 15/1823* (2013.01); *G03G 15/5079* (2013.01); *G06K 15/005* (2013.01); *G03G 15/502* (2013.01)
USPC ......................................................... 358/1.15

(58) Field of Classification Search
CPC ....................... H04N 1/00482; H04N 1/00424
USPC ......................................................... 358/1.15
See application file for complete search history.

(56) References Cited

U.S. PATENT DOCUMENTS

| | | | |
|---|---|---|---|
| 2003/0202202 A1* | 10/2003 | Miyata ......................... | 358/1.14 |
| 2007/0146789 A1 | 6/2007 | Mima et al. | |
| 2008/0080003 A1* | 4/2008 | Ferlitsch et al. ............. | 358/1.16 |
| 2010/0034550 A1* | 2/2010 | Arai et al. ........................ | 399/81 |
| 2011/0083095 A1* | 4/2011 | Konuma ........................ | 715/772 |

FOREIGN PATENT DOCUMENTS

| | | |
|---|---|---|
| JP | 2003-330644 A | 11/2003 |
| JP | 2007-168383 A | 7/2007 |

\* cited by examiner

*Primary Examiner* — Saeid Ebrahimi Dehkordy
(74) *Attorney, Agent, or Firm* — Canon USA Inc. IP Division

(57) ABSTRACT

A printing apparatus is configured to, when a specific type of sheet has been designated by the user as a sheet to be replenished, specify a storage unit to be replenished with the specific type of sheet based on information about the sheet used by the print job now being executed and the sheets going to be used by queued print jobs, and information about the sheets that are stored in a plurality of storage units.

8 Claims, 18 Drawing Sheets

PRINTING APPARATUS, PRINTING APPARATUS CONTROL METHOD, AND STORAGE MEDIUM

BACKGROUND OF THE INVENTION

1. Field of the Invention

The present invention relates to a printing apparatus, a printing apparatus control method, and a storage medium.

2. Description of the Related Art

Recently, along with the growth of the production printing market, large quantities of print product are often times generated using a printing apparatus such as a digital copying machine and a digital multifunction peripheral. On the other hand, a feed tray in a printing apparatus often feeds at most about 1,000 to 2,000 sheets of cut paper per feed tray. Consequently, to efficiently generate a large quantity of print product, it is necessary for the operator to appropriately replenish a plurality of feed trays with the sheets required for printing so that printing does not stop.

Generally, such a feeding operation is performed by the operator comprehensively determining the number of sheets required for a print job, the print job schedule, and the remaining amount of sheets in the feed trays, for example, and then the feed trays and the replenishment timing are determined. Consequently, due to human error or lack of skill of the operator, printing can be unintentionally stopped. On the other hand, Japanese Patent Application Laid-Open Nos. 2007-168383 and 2003-330644 discuss methods for supporting the operator in such a replenishment operation. However, in Japanese Patent Application Laid-Open Nos. 2007-168383 and 2003-330644, the operator is notified of the sheet and feed tray to be replenished just before a print job starts or during an interruption of the print job. Therefore, the methods cannot notify the operator by automatically determining the trays to be replenished with sheets so that the print job is not stopped.

SUMMARY OF THE INVENTION

According to an aspect of the present invention, a printing apparatus includes a plurality of storage units configured to store sheets, a storage device configured to store information about the sheets stored in the plurality of storage units, a reception unit configured to receive from a user information indicating a specific type of sheet to replenish the plurality of storage units, a specification unit configured to specify from among the plurality of storage units the storage unit to be replenished with the specific type of sheet based on information stored in the storage device and information indicating the sheets used by a print job now being executed and queued print jobs in the printing apparatus, and a notification unit configured to notify the user to replenish the storage unit specified by the specification unit with the specific type of sheet.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

<Description of the System Configuration>

Figure 1:
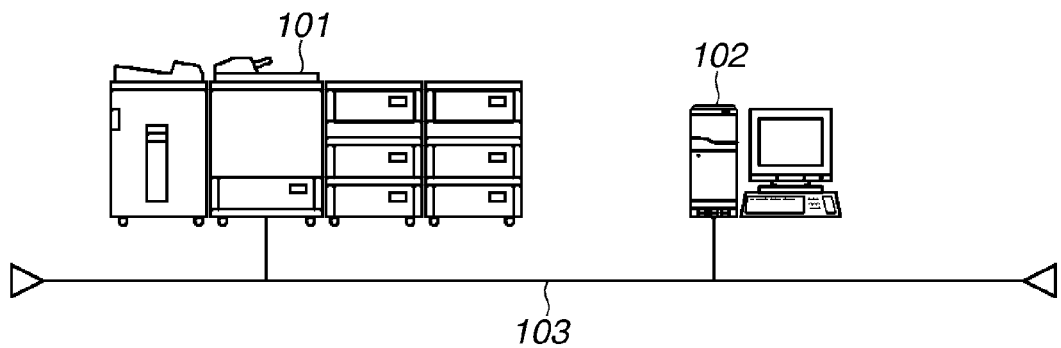
FIG. 1 illustrates a configuration of a printing system according to an exemplary embodiment.

FIG. 1 illustrates a configuration of a printing system according to a first exemplary embodiment. The printing system illustrated in FIG. 1 is configured with a printing apparatus 101, an information processing apparatus 102, and a network 103.

The printing apparatus 101 executes printing based on a print job input from an external apparatus. Further, the printing apparatus 101 can not only execute printing based on a print job, but can also execute a copy function and a send function (send a document image read by a scanner to another apparatus). The information processing apparatus 102 is, for example, a personal computer (PC), and is configured such that it can communicate with the printing apparatus 101 via the network 103. By installing a printer driver in the information processing apparatus 102, a print job can be input from the information processing apparatus 102 into the printing apparatus 101.

Figure 2:
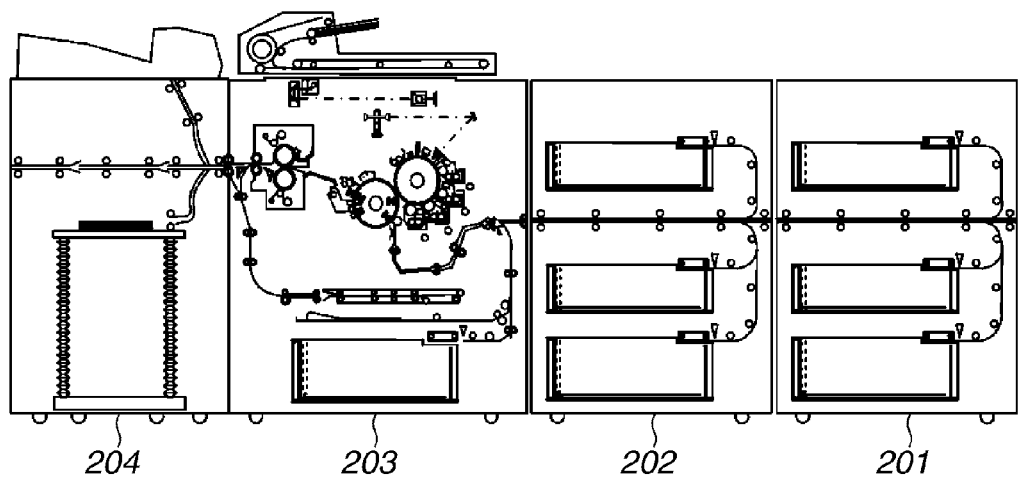
FIG. 2 is a cross-sectional view illustrating a configuration of the printing apparatus illustrated in FIG. 1.

FIG. 2 is a cross-sectional view illustrating a configuration of the printing apparatus 101 illustrated in FIG. 1.

In FIG. 2, the printing apparatus 101 is configured with an external feeding apparatus 201, an external feeding apparatus 202, a printing apparatus 203, and a large-capacity stacker 204.

The external feeding apparatus 201 and the external feeding apparatus 202 are configured to provide the sheets to be used in printing to the printing apparatus 203. The printing apparatus 203 performs printing on sheets fed from the external feeding apparatus 201, the external feeding apparatus 202, and feed trays attached to the printing apparatus 203. The large-capacity stacker 204 is a paper discharge device capable of accumulating a large amount of print product. The large-capacity stacker 204 is mainly used for accumulating a large amount of print product when the external feeding apparatus 201 and the external feeding apparatus 202 are used.

Figure 3:
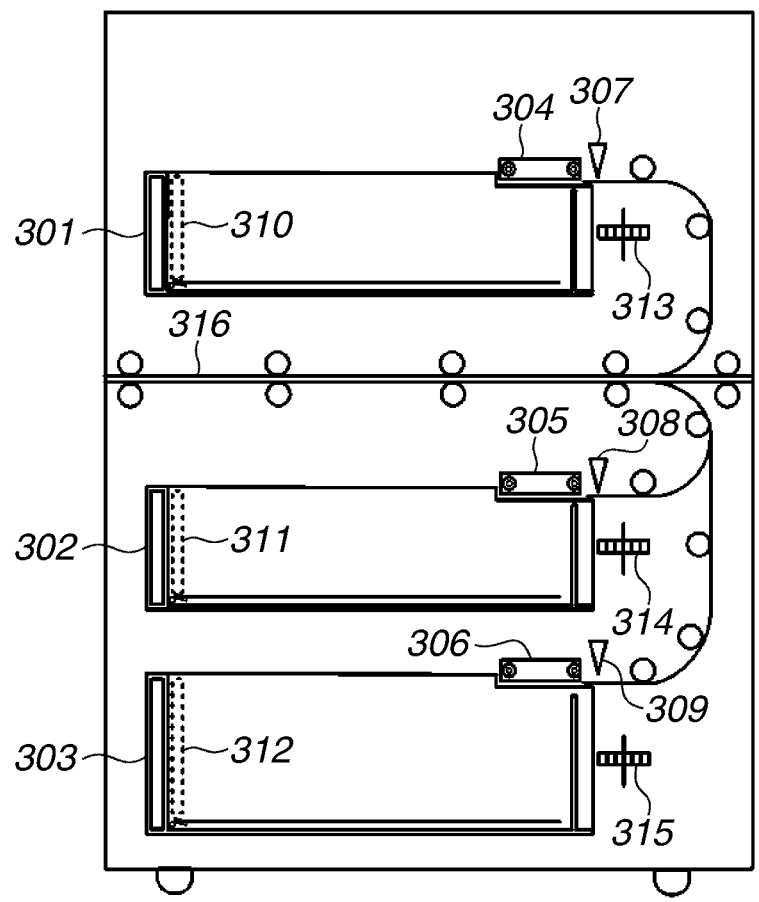
FIG. 3 is a cross-sectional view illustrating a configuration of the external feeding apparatuses illustrated in FIG. 2.

FIG. 3 is a cross-sectional view illustrating a configuration of the external feeding apparatus 201 and the external feeding apparatus 202 illustrated in FIG. 2. Since the external feeding apparatus 201 and the external feeding apparatus 202 have the same configuration, the external feeding apparatus 202 will be described here as an example.

In FIG. 3, a straight path 316 is a path that conveys sheets conveyed from a feed tray 301, a feed tray 302, a feed tray 303, and from the upstream side, to the downstream side. In the present exemplary embodiment, the external feeding apparatus 202 is arranged downstream from the external feeding apparatus 201 and upstream from the printing apparatus 203. Consequently, the external feeding apparatus 202 conveys the sheets in the feed tray 301, the feed tray 302, and the feed tray 303, and the sheets conveyed from the external feeding apparatus 201, to the printing apparatus 203 via the straight path 316.

The feed tray 301, the feed tray 302, and the feed tray 303 are trays for feeding sheets. By using a lift-up motor (not illustrated) to lift up the bottom portion of the feed trays, the fed sheets can be brought into contact with a sheet feeding motor 304, a sheet feeding motor 305, and a sheet feeding motor 306. Based on this configuration, paper feeding can be performed regardless of the sheet amount.

The sheet feeding motor 304, the sheet feeding motor 305, and the sheet feeding motor 306, respectively, convey sheets to the straight path 316 by pulling out one sheet at a time from the feed tray 301, the feed tray 302, and the feed tray 303, and feeding the pulled-out sheet to the conveyance path. A sheet feeding sensor 307, a sheet feeding sensor 308, and a sheet feeding sensor 309 are configured to confirm that the sheets from the feed tray 301, the feed tray 302, and the feed tray 303 have been normally conveyed. These sensors allow the printing apparatus to determine that a delay jam has occurred if a sheet has not been conveyed within a predetermined time, or to calculate the number of sheets that have been fed from the feed trays.

A remaining amount sensor 310, a remaining amount sensor 311, and a remaining amount sensor 312 are sensors that detect a sheet amount by measuring the height between the sheet feeding motors and the bottom portion of the feed trays. The remaining amount sensor 310, the remaining amount sensor 311, and the remaining amount sensor 312 detect how many sheets are remaining based on the measured height and thickness of sheet. The bottom portion of the feed trays is brought closer to the sheet feeding motors by the lift-up motor as the remaining sheet amount decreases. Consequently, by using the remaining amount sensor 310, the remaining amount sensor 311, and the remaining amount sensor 312, the sheet amount in the feed trays can be detected.

An opening motor 313, an opening motor 314, and an opening motor 315 are motors that are used when pulling out the feed tray 301, the feed tray 302, and the feed tray 303. By using the opening motor 313, the opening motor 314, and the opening motor 315, a feed trays can be opened even if the operator does not pull out the feed tray by physical force.

Figure 4:
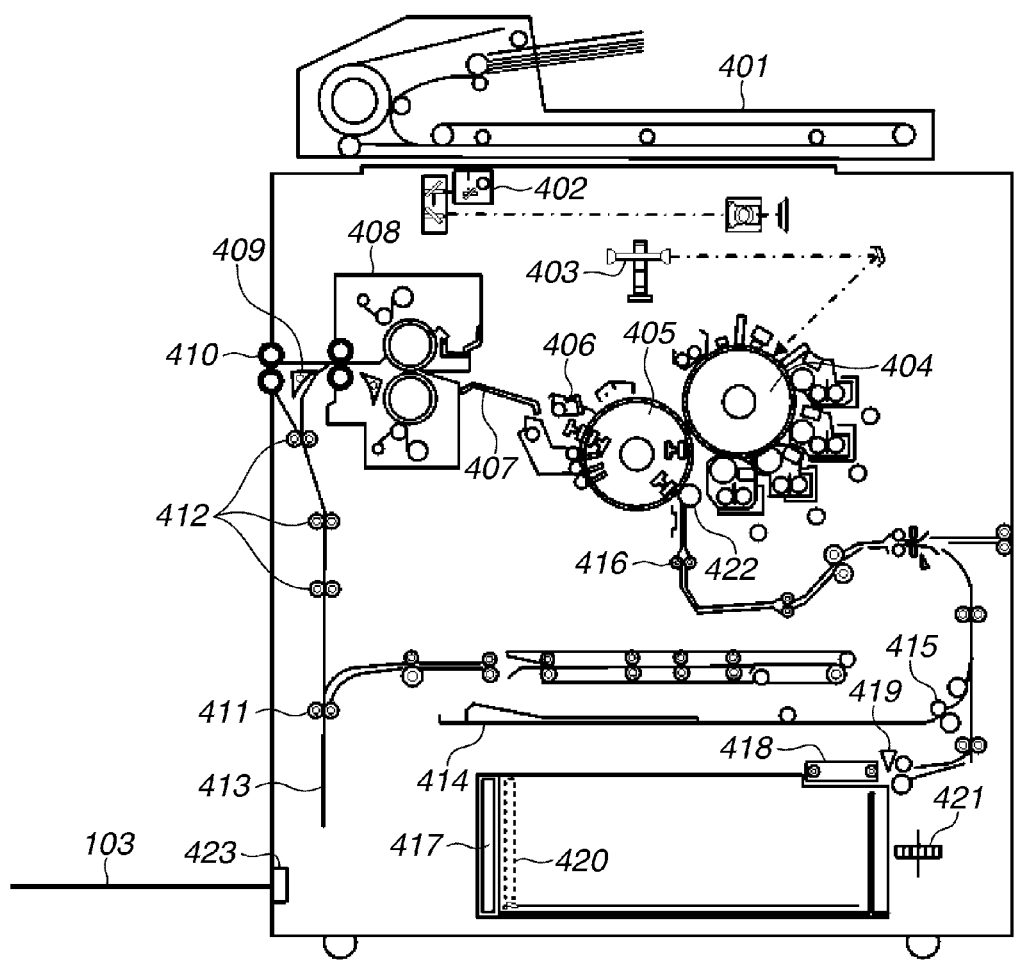
FIG. 4 is a cross-sectional view illustrating a configuration of the printing apparatus main body illustrated in FIG. 1.

FIG. 4 is a cross-sectional view illustrating a configuration of the printing apparatus 203 illustrated in FIG. 1. In FIG. 4, an automatic feeding apparatus (ADF) 401 separates the sheets in a document stack that is set on a stacking face of a document tray in order of page from the first page of the document, and conveys the separated sheets onto a platen to perform scanning by a scanner 402.

The scanner 402 reads an image of the document conveyed to the platen, and converts the read image into image data with a charge-coupled device (CCD). A rotating polygonal mirror (e.g., a polygon mirror) 403 is hit by a light beam, such as as laser light, modulated based on the image data. The rotating polygonal mirror 403 irradiates a photosensitive drum 404 with the incident light (i.e., reflected scanning light) via a reflection mirror. A latent image formed on the photosensitive drum 404 by the laser light is developed by a toner, and a toner image is transferred onto a sheet clinging to a transfer drum 405. This series of image forming processes is sequentially executed for yellow (Y), magenta (M), cyan (C), and black (K) toners to form a full color image. After the image forming processes are carried out four times, the sheet on the transfer drum 405 on which the full color image has been transferred is separated by a separation claw 406, and conveyed to a fixing device 408 by a pre-fixing carrier 407.

The fixing device 408, which is configured with a combination of rollers and belts, includes a heat source such as a halogen heater. The fixing device 408 fixes the toners on the sheet on which the toner image has been transferred, by dissolving and fixing the toners with heat and pressure. A sheet discharge flapper 409, which is configured such that it can pivot about a pivot shaft, regulates a conveyance direction of the sheet. When the sheet discharge flapper 409 is pivoted in the clockwise direction of FIG. 4, the sheet is conveyed in a straight direction, and is discharged from the apparatus by a sheet discharge roller 410.

On the other hand, when an image is formed on both sides of the sheet, the sheet discharge flapper 409 pivots in the anticlockwise direction of FIG. 4, so that the sheet changes course to a downward direction and is fed to a two-sided conveyance unit. The two-sided conveyance unit includes a reverse flapper 411, a reverse roller 412, a reverse guide 413, and a two-sided tray 414. The reverse flapper 411, which is configured such that it can pivot about a pivot shaft, regulates a conveyance direction of the sheet. When processing a two-sided print job, by pivoting the reverse flapper 411 in the anticlockwise direction of FIG. 4, a sheet with an image printed on one side is fed to the reverse guide 413 via the reverse roller 412.

The reverse rollers 412 are temporarily stopped in a state in which the trailing edge of the sheet is sandwiched between the reverse rollers 412. The reverse flapper 411 is then pivoted in the clockwise direction in FIG. 4. Further, the reverse rollers 412 are rotated in the reverse direction. Consequently, the sheet reverses its direction, and is guided to the two-sided tray 414 with the trailing edge and the leading edge of the sheet reversed.

The sheet is temporarily stacked on the two-sided tray 414. Subsequently, the sheet is again fed to registration rollers 416 by a re-feeding roller 415. At this stage, the face of the sheet opposite to that in the transfer process on the first side is fed to the side facing the photosensitive drum. Then, an image for the second face is formed on the second face of the sheet in the same manner as in the process described above. After the images have been formed on both faces of the sheet, the images are fixed, and the sheet is discharged out of the printing apparatus body by the sheet discharge roller 410.

By executing this series of two-sided printing sequences, two-sided printing can be executed by the printing apparatus on both the first and second faces of a two-sided print job sheet.

A feed tray 417 is a tray for feeding sheets. By using a lift-up motor (not illustrated) to lift up the bottom portion of the feed trays, the fed sheets can be brought into contact with a sheet feeding motor 418. Based on this configuration, paper feeding can be performed regardless of the sheet amount.

The sheet feeding motor 418 conveys the sheet to a conveyance path by pulling out one sheet at a time from the feed tray 417. A sheet feeding sensor 419 is a sensor for confirming that the sheet has been normally conveyed from the feed tray 417. This sensor allows the printing apparatus to determine that a delay jam has occurred if a sheet has not been conveyed within a predetermined time, or to calculate the number of sheets that have been fed from the feed tray.

A remaining amount sensor 420 is a sensor that measures the height between the sheet feeding motor 418 and the bottom portion of the feed tray. The remaining amount sensor 420 detects how many sheets are remaining based on the measured height and thickness of sheet. The bottom portion of the feed tray is brought closer to the sheet feeding motor by the lift-up motor as the remaining sheet amount decreases. Consequently, by using the remaining amount sensor 420, the sheet amount in the feed tray can be detected. An opening motor 421 is a motor that is used when pulling out the feed tray 417. By using the opening motor 421, the feed tray 417 can be opened even if the operator does not pull out the feed tray by physical force.

The sheet fed from the feed tray 417 is guided along a conveyance guide, and is conveyed to the registration rollers 416 by a plurality of conveyance rollers. At this point the registration rollers 416 are being stopped. The leading edge of the sheet hits a nip portion formed by the pair of registration rollers 416, forms a loop, and the sheet skew is corrected. Subsequently, in the image forming unit, the registration rollers 416 start to rotate and convey the sheet in conjunction with the toner image formed on the photosensitive drum 404. The sheet fed by the registration rollers 416 is electrostatically attracted to the surface of the transfer drum 405 by an attraction roller 422. The sheet discharged from the fixing device 408 is discharged out of the apparatus by the sheet discharge roller 410.

A network connector 423 is a connection unit for connecting with the network 103. For example, if the network 103 is an Ethernet®, an RJ-45 shaped connector may be used.

Figure 5:
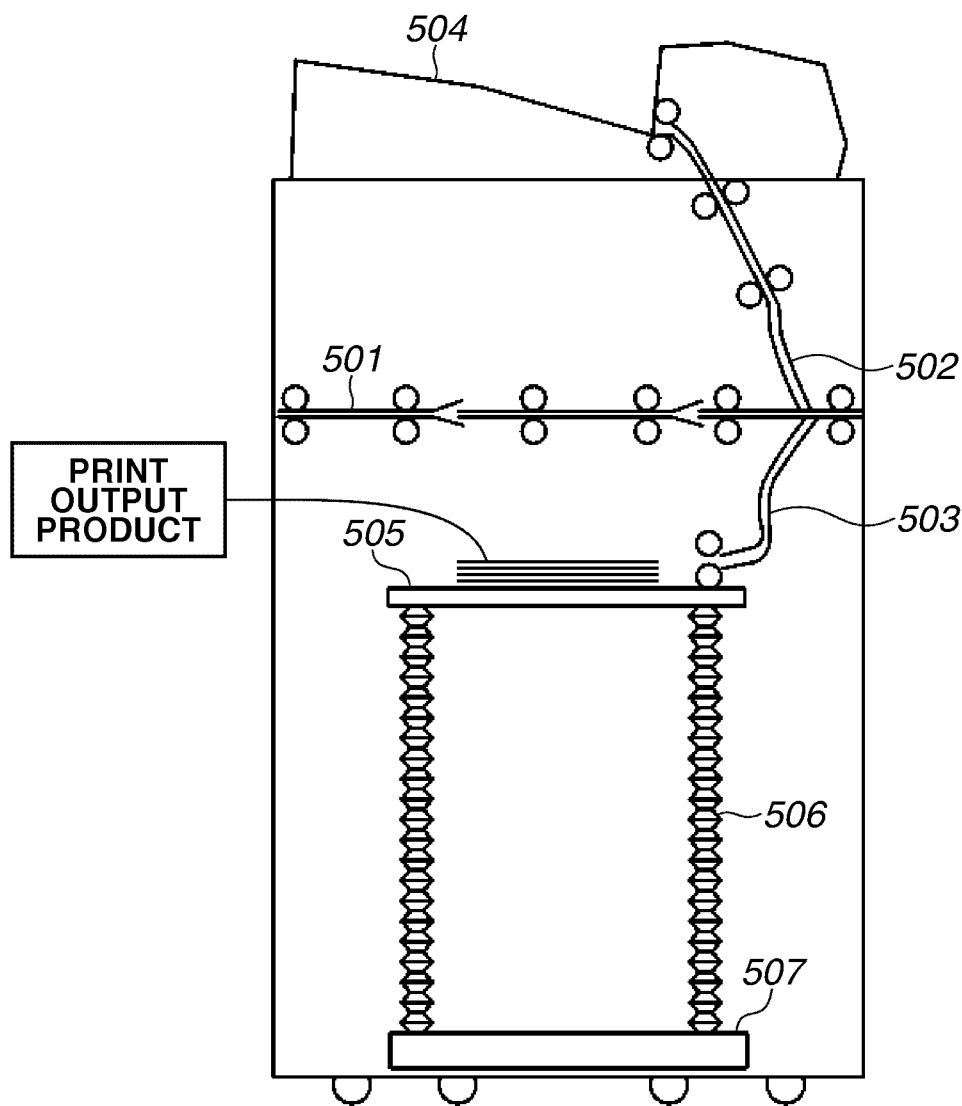
FIG. 5 is a cross-sectional view illustrating a configuration of the large-capacity stacker illustrated in FIG. 2.

FIG. 5 is a cross-sectional view illustrating a configuration of the large-capacity stacker 204 illustrated in FIG. 2. The large-capacity stacker 204 includes three conveyance paths, a straight path 501, an escape path 502, and a stack path 503. Further, the large-capacity stacker 204 includes an escape tray 504 and a stack tray 505. The straight path 501 is a conveyance path for conveying a sheet received from the printing apparatus 203.

The escape path 502 is used when the user wants to discharge the sheet without stacking. For example, when performing a discharge confirmation (proof printing), the sheet is discharged from the escape path 502 to the escape tray 504. A plurality of detection sensors for detecting a sheet conveyance state or a jam is provided along the sheet conveyance paths in this large-capacity stacker 204.

The stack path 503 is a conveyance path for conveying the sheet to a stacking unit provided in the printing apparatus. For example, when a request to perform stacking processing is received from the operator, the sheet is discharged to the stack tray 505 via the stack path 503.

The stack tray 505 is a stacking unit that stacks sheets on an extensible stay 506. A shock absorber and the like is provided at a joining portion of the stack tray 505 and the stay 506. Beneath the extensible stay 506, a wagon 507 is provided. The wagon 507 has a handle (not illustrated), with which the stack output placed on the wagon can be transported to a separate offline finisher or the like.

Further, when a front door of the stacker unit is closed, the extensible stay 506 is raised to a position where the stack output can be easily placed. On the other hand, when the front door is opened by the operator (or an open instruction has been made), the stack tray 505 is lowered so that it can be easily removed.

With the above configuration, the large-capacity stacker 204 can discharge a large amount of print product to the stack tray 505 and discharge a small amount of print product, such as a printing sample, to the escape tray 504.

Figure 6:
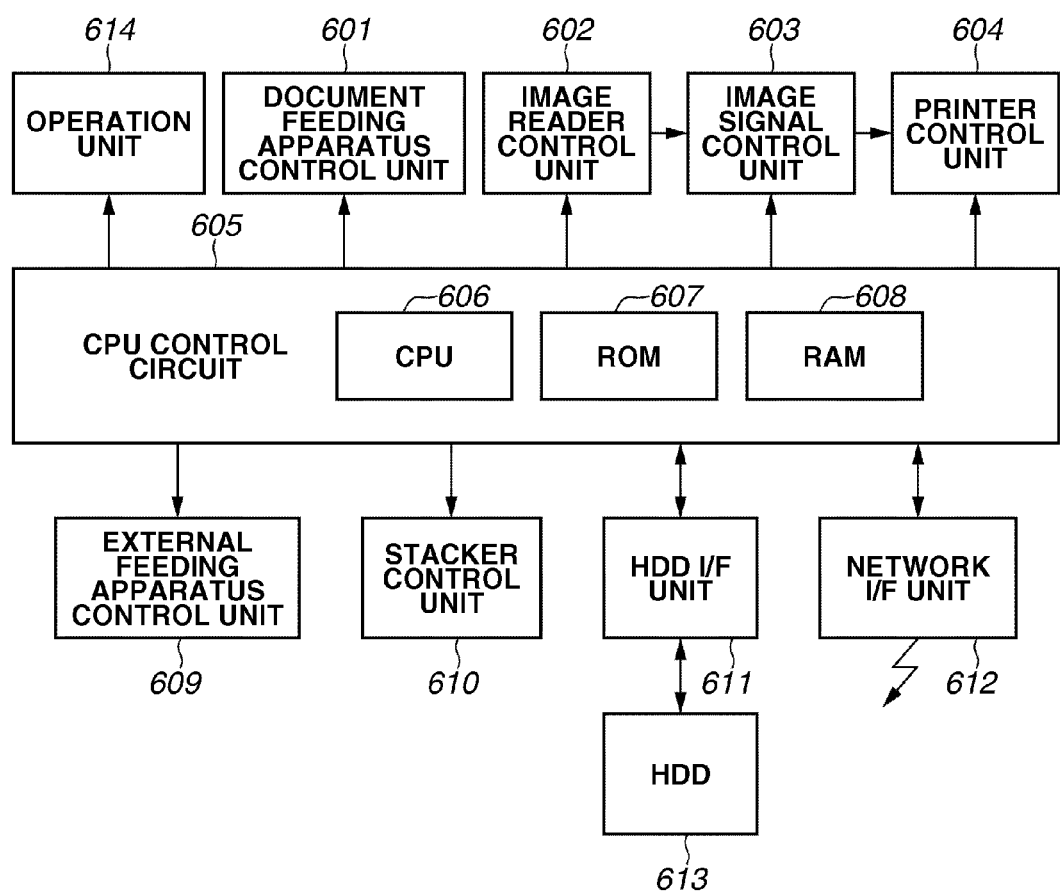
FIG. 6 is a block diagram illustrating a hardware configuration of the printing apparatus illustrated in FIG. 1.

FIG. 6 is a block diagram illustrating a hardware configuration of the printing apparatus 101 illustrated in FIG. 1. In FIG. 6, a CPU circuit unit 605 includes a CPU 606, which controls each control unit described below by executing on a random access memory (RAM) 608 a program stored in a read-only memory (ROM) 607. The control units are a document feeding apparatus control unit 601, an image reader control unit 602, an image signal control unit 603, and a printer control unit 604, an external feeding apparatus control unit 609, a stacker control unit 610, a hard disk drive (HDD) I/F unit 611, and a network I/F unit 612.

The document feeding apparatus control unit 601 controls the automatic document feeder 401. The image reader control unit 602 control the scanner 402. The printer control unit 604 controls the photosensitive drum 404, the fixing device 408, and the feed tray 417. The external feeding apparatus control unit 609 controls the external feeding apparatus 201 and the external feeding apparatus 202.

The stacker control unit 610 controls the large-capacity stacker 204. The HDD I/F unit 611, which is an interface with a HDD 613, controls the reading and writing to/from the HDD 613. The network I/F unit 612 controls the transmission and reception of data via the network 103. The HDD 613, which is a large-capacity storage device, is an area for storing non-volatile data.

The RAM 608 is used as an area for temporarily storing control data and as a work area for performing calculations associated with the control. The network I/F unit 612 is connected to the information processing apparatus 102 via the network 103. Image data read by the scanner 402 is output to the image signal control unit 603 from the image reader control unit 602. Further, image data output to the printer control unit 604 from the image signal control unit 603 is formed into an image by a printer engine, and printed on a sheet fed from the feed tray 417, for example. Then, the printed sheet is subjected to post-processing based on a user-designated output format.

The post-processing is processing performed by the stacker control unit 610. For example, when discharging the sheet to the large-capacity stacker 204, the stacker control unit 610 performs the post-processing. For example, the stacker control unit 610 performs control to discharge the sheet to the escape tray 504 or the stack tray 505 based on a designated discharge destination.

An operation unit 614 includes a display unit (a liquid crystal display unit having a touch panel function) capable of displaying the various operation screens described below, and a keyboard.

Figure 7:
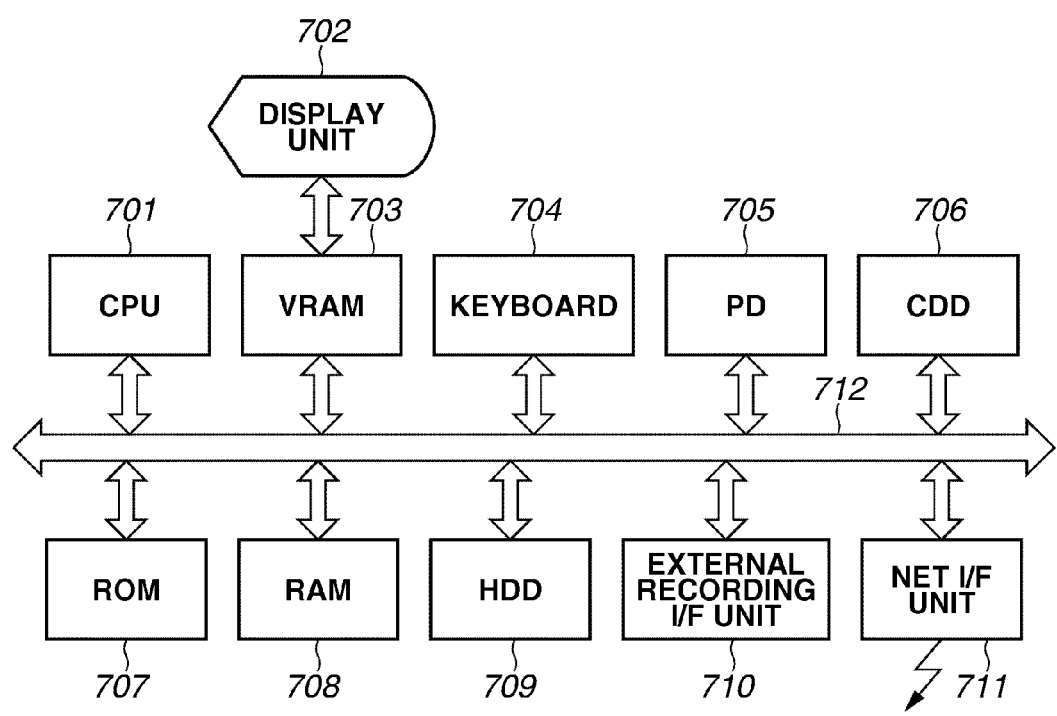
FIG. 7 is a block diagram illustrating a hardware configuration of the information processing apparatus illustrated in FIG. 1.

FIG. 7 is a block diagram illustrating a hardware configuration of the information processing apparatus 102 illustrated in FIG. 1. In FIG. 7, a central processing unit (CPU) 701 controls the various devices connected to the CPU device based on programs stored in a ROM 707, a HDD 709, and a compact disk drive (CDD) 706.

A display unit 702 displays on a display screen, for example, windows, icons, messages, menus, and other user interface information. A video RAM (VRAM) 703 renders images to be displayed on the display unit 702. The image data generated in this VRAM 703 is transferred to the display unit 702 based on a predetermined rule to display an image on the display unit 702.

A keyboard 704 includes various keys for performing character input. A pointing device (PD) 705 is used for specifying an icon, a menu, or other objects to be displayed on the display screen of the display unit 702.

The CDD 706 is a device that performs reading and writing of various control programs and data to/from a recording medium, such as a CD-ROM and a (CD recordable) CD-R. The CDD 706 may also be a digital versatile disk (DVD) drive.

The ROM 707 stores various kinds of control programs and data. The RAM 708 includes a work area for the CPU 701, a data save area for error processing, a load area for control programs and the like. For example, the information processing apparatus 102 includes a function of performing raster image processing (RIP) on electronic data and transmitting the processed data to the printing apparatus 101. The program therefor is stored in the ROM 707, and uses the CPU 7601 work area and the RAM 708 during RIP processing.

The HDD 709, which serves as an internal recording apparatus, stores various control programs and various data. An external recording I/F unit 710 is a device that performs reading and writing to/from an external recording medium, such as a universal serial bus (USB) memory. A network interface (Net-I/F) 711 can transmit and receive data to/from the printing apparatus 101 via the network 103. A CPU bus 712 includes an address bus, a data bus, and a control bus.

Figure 8:
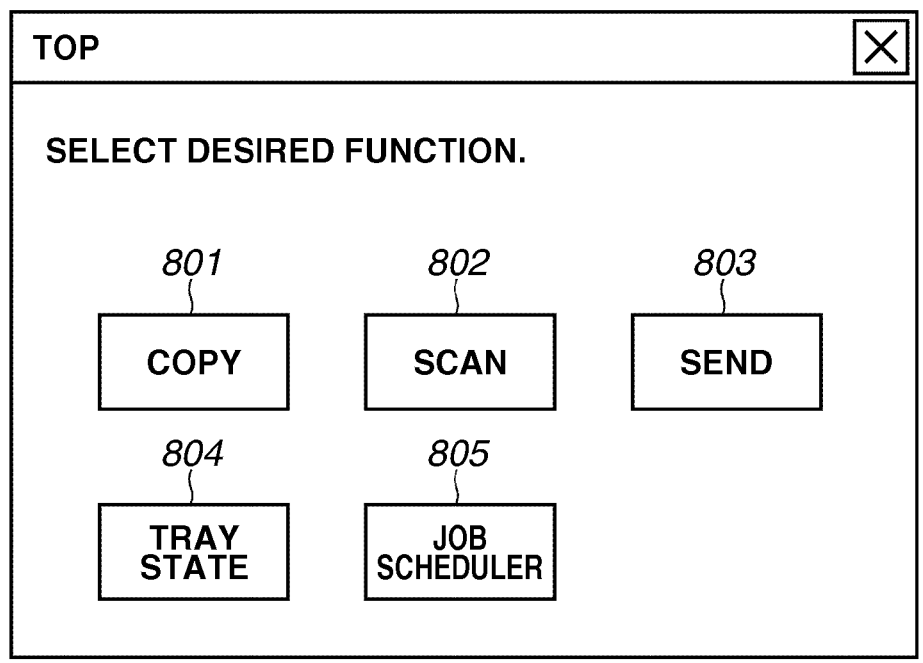
FIG. 8 illustrates a user interface screen displayed by a printing apparatus.

Next, the various operation screens displayed on the operation unit 614 of the printing apparatus 101 will be described with reference to FIGS. 8 to 12. FIG. 8 illustrates a screen for selecting a function desired by the user from among the functions provided by the printing apparatus 101. The operation unit 614 is configured with a touch panel. The user can use a desired function by touching one of the buttons 801 to 805. While in the present exemplary embodiment, the screen illustrated in FIG. 8 is displayed on the operation unit 614 as an initial screen, a screen (not illustrated) for performing user authentication can also be displayed before the screen illustrated in FIG. 8 is displayed.

The button 801 is provided to use a copy function in the printing apparatus 101. When the user touches the button 801, a copy setting screen (not illustrated) is displayed. The button 802 is provided to use a scan function in the printing apparatus 101. The scan function is a function of storing image data generated by the scanner 402 reading a document, in the HDD 613 and the like. When the user touches the button 802, a scan setting screen (not illustrated) is displayed. The button 803 is provided to use a send function in the printing apparatus 101. When the user touches the button 803, a transmit setting screen (not illustrated) is displayed.

When the user touches the button 804, a screen that causes the user to confirm the type of sheet to be stored in the tray is displayed on the operation unit 614. The screen displayed at this stage will be described in detail with reference to FIG. 9. When the user touches the button 805, a screen that causes the user to confirm the execution schedule of the print jobs (the print job now being executed and queued print jobs) input into the printing apparatus 101 is displayed on the operation unit 614. The screen that is displayed at this stage will be described in more detail with reference to the job schedule screen illustrated in FIG. 11.

Figure 9:
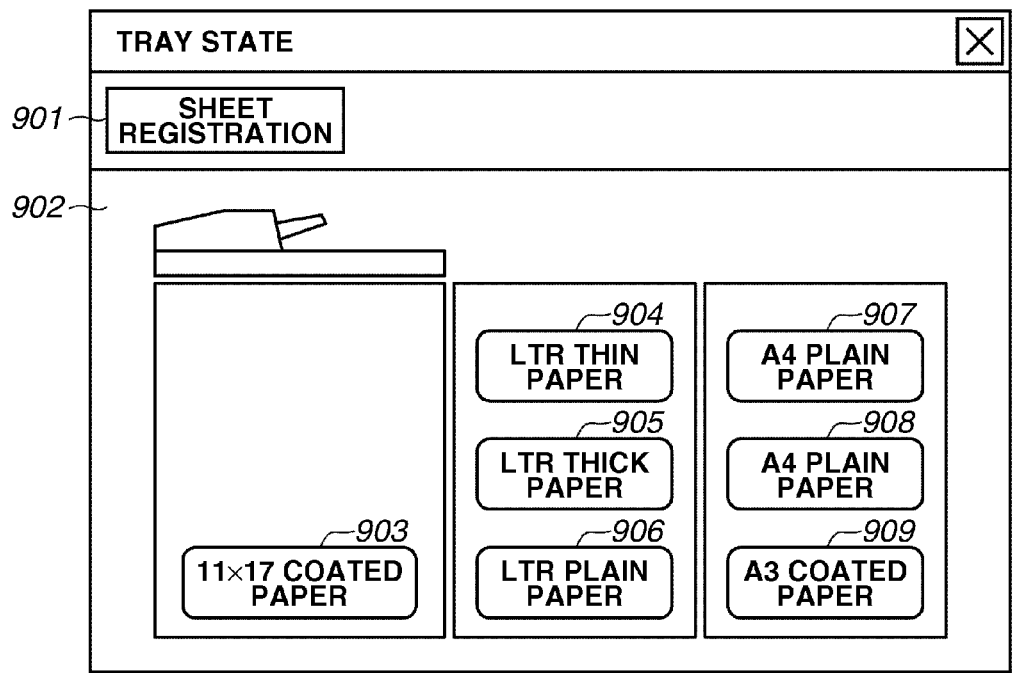
FIG. 9 illustrates a user interface screen displayed by a printing apparatus.

FIG. 9 illustrates a screen displayed on the operation unit 614 of the printing apparatus 101 that causes the user to confirm the type of sheet stored in a tray. On section 902, an external view of the printing apparatus 101 and the feed trays included in the printing apparatus 101 are displayed. Buttons 903 to 909 indicate the feed trays included in the printing apparatus 101, that is, the feed tray 417, and the feed tray 301, the feed tray 302 and the feed tray 303, which respectively correspond to the three feed trays in the external feeding apparatus 202. Each time there is a change in the number of feed trays for the printing apparatus 101, for example, when the number of external feeding apparatuses increases, the content displayed on the section 902 changes. The buttons 903 to 909 respectively correspond to one type of sheet associated with each feed tray. This association is stored in the HDD 613, for example.

Figure 10:
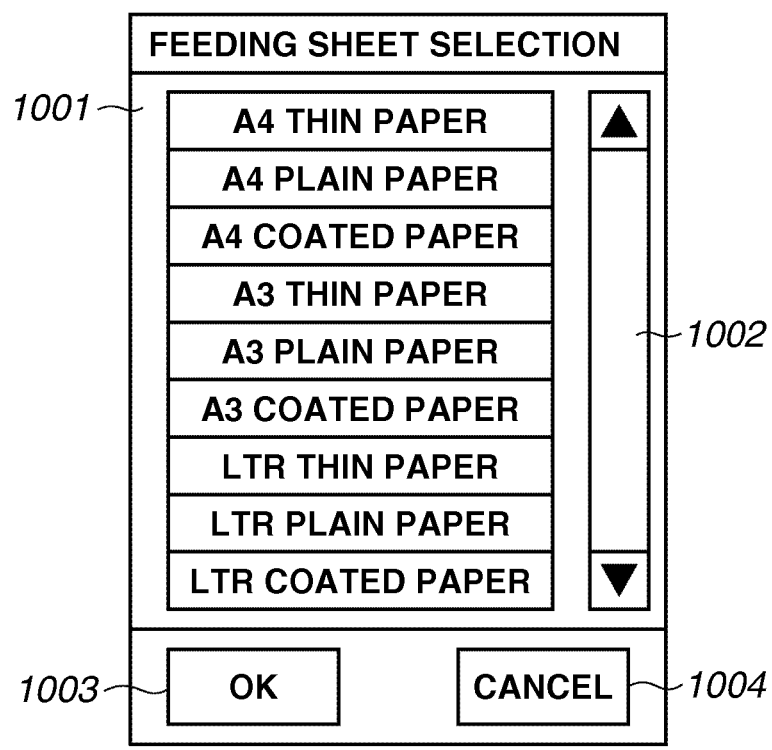
FIG. 10 illustrates a user interface screen displayed by a printing apparatus.

By using the screen illustrated in FIG. 9, the user can change the type of sheet that is registered for each feed tray of the printing apparatus 101. Specifically, first, the user selects one of the buttons 903 to 909, and then touches a registration button 901. As a result, the screen illustrated in FIG. 10 is displayed on the operation unit 614. In a section 1001 of FIG. 10, the sheets that can be used by the printing apparatus 101 are displayed. In FIG. 10, although only nine types of sheet are displayed, all of the types of sheet that can be used are displayed by scrolling a bar 1002.

When the user selects the desired type of sheet and touches an OK button 1003, the selected type of sheet is registered for the feed tray selected in FIG. 9. If the cancel button is touched, the screen returns from the screen illustrated in FIG. 10 to the screen illustrated in FIG. 9.

Figure 11:
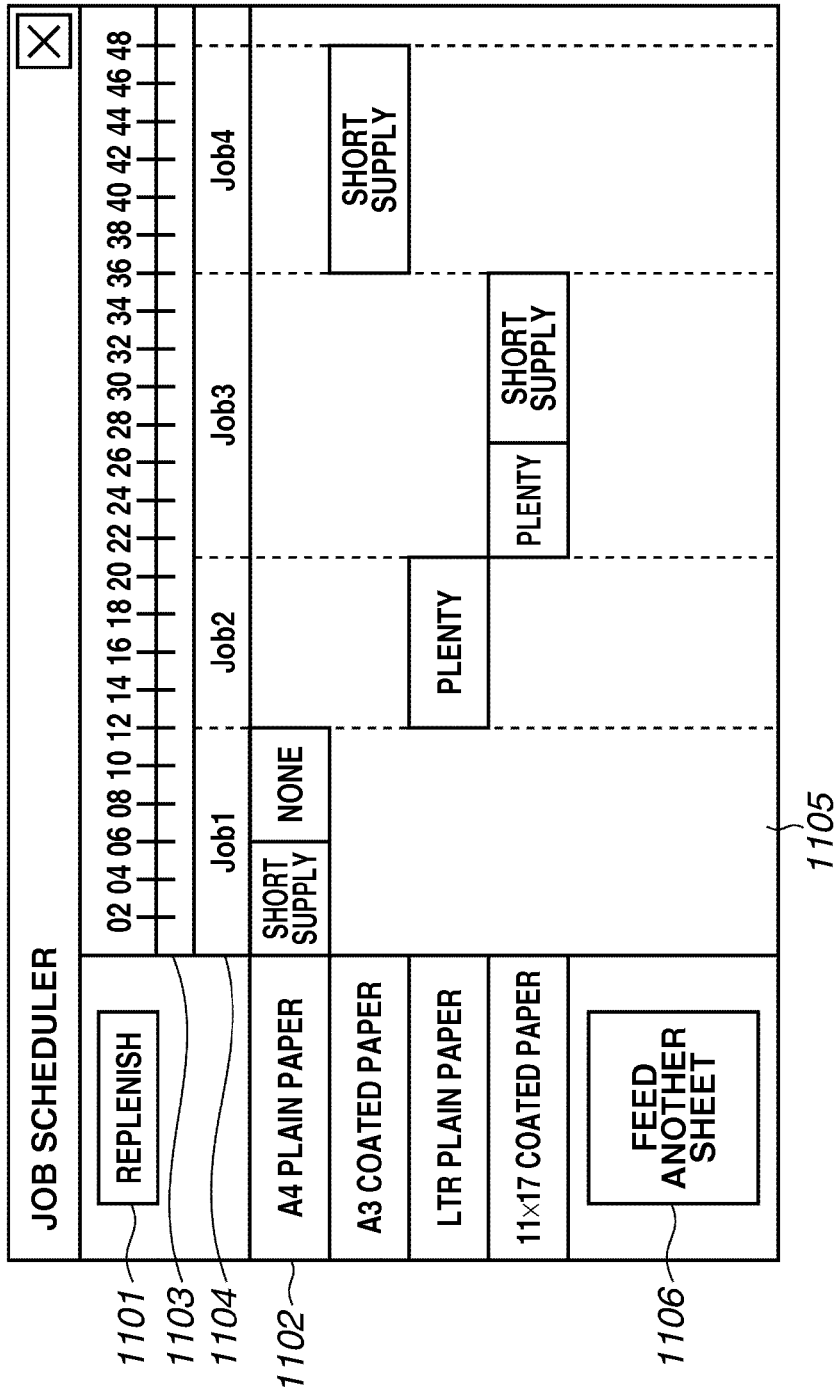
FIG. 11 illustrates a user interface screen displayed by a printing apparatus.

FIG. 11 illustrates a screen displayed on the operation unit 614 of the printing apparatus 101 that causes the user to confirm the execution schedule of the print jobs input into the printing apparatus 101. The jobs input into the printing apparatus 101 are displayed in a section 1105. FIG. 11 illustrates a case in which four jobs, jobs 1 to 4, have been input. A section 1104 indicates when each of the jobs 1 to 4 is to be executed along a time axis 1103. In the present exemplary embodiment, job 1 is the print job now being executed, and the job 2, job 3, and job 4 are print jobs to be executed in this order following job 1. The time axis 1103 represents time in units of minutes, and shows that the job 1 is now being executed, and the job 2 is to be executed 12 minutes later.

A section 1102 indicates the type of sheet to be used by the print jobs input into the printing apparatus 101. In FIG. 11, it can be seen that the sheet to be used in the job 1 is "A4 plain paper", and that the sheet to be used in the job 2 is "LTR plain paper". The sheets to be used in the print jobs are designated by the print jobs input into the printing apparatus 101. In the FIG. 11 screen, the user can confirm the remaining amount of a sheet to be used by a print job. For example, since "LTR plain paper" is indicated as being "plenty", it can be seen that there will be plenty of the sheets remaining until the execution of the job 2 is completed. If the remaining amount of sheets in the printing apparatus 101 is greater than a first threshold (e.g., 100 sheets), the screen displays "plenty". This threshold is not limited to 100 sheets, and can be changed to another value based on a user designation.

On the screen illustrated in FIG. 11, it is indicated that "A3 coated paper" is in "low supply" when the job 4 is executed. It can thus be seen that when the execution of the job 4 starts, there is only a little amount of remaining sheets. In the present exemplary embodiment, when the remaining number of sheets is equal to or less than the first threshold, "low supply" is indicated.

Further, in the job 1, the remaining amount of "A4 plain paper" changes from "low supply" to "none" before the job 1 is completed. This indicates that the remaining amount of "A4 plain paper" will reach zero before the job 1 is completed, thus causing a paper out error. In the present exemplary embodiment, the timing at which the sheet remaining amount changes from "plenty" to "low supply" and from "low supply" to "none" is calculated by the CPU 606 based on the sheet remaining amount and the number of sheets to be used by the print job.

When looking at the job 1 on the screen illustrated in FIG. 11, it can be seen that the remaining amount of "A4 plain paper" will reach zero before the job 1 is completed. If printing is stopped because the remaining amount of "A4 plain paper" reaches zero and the paper out error occurs, the start of execution of the following jobs 2 to 4 will be delayed. Although it is desirable for the user to replenish the printing apparatus 101 with "A4 plain paper" before the remaining amount of "A4 plain paper" reaches zero, if "A4 plain paper" is supplied into a feed tray that contains "LTR plain paper", printing will stop again due to the paper out error when the job 2, which uses "LTR plain paper", is executed. In other words, the user needs to determine the feed tray to be replenished with sheets while considering not only the print job now being executed, but also the type of sheets to be used in the queued jobs, so that the burden on the user is increased. To reduce the burden on the user, the printing apparatus 101 presents the user with the below-described functions.

For example, on the screen illustrated in FIG. 11, the user may want to replenish before the remaining amount of "A4 plain paper" reaches zero. This can be achieved by the user selecting "A4 plain paper" in the section 1102, and touching the button 1101. While this operation will be described in more detail with reference to the flowcharts illustrated in FIGS. 13 to 15, the CPU 606 executes determination processing to determine the appropriate feed tray for the user to replenish with "A4 plain paper", and notifies the user to replenish the feed tray determined by the determination processing with "A4 plain paper".

The user may also want to, on the screen illustrated in FIG. 11, replenish with a type of sheet different from that which is displayed in section 1102. This can be achieved by the user touching the button 1106. When the user touches the button 1106, a screen is displayed on the operation unit 614 that causes the user to select a desired sheet type from among all the types of sheet, and designate the type of sheet that he/she wants to replenish. Since the screen displayed on the operation unit 614 is similar to the screen illustrated in FIG. 10, a description thereof will be omitted here.

Figure 13:
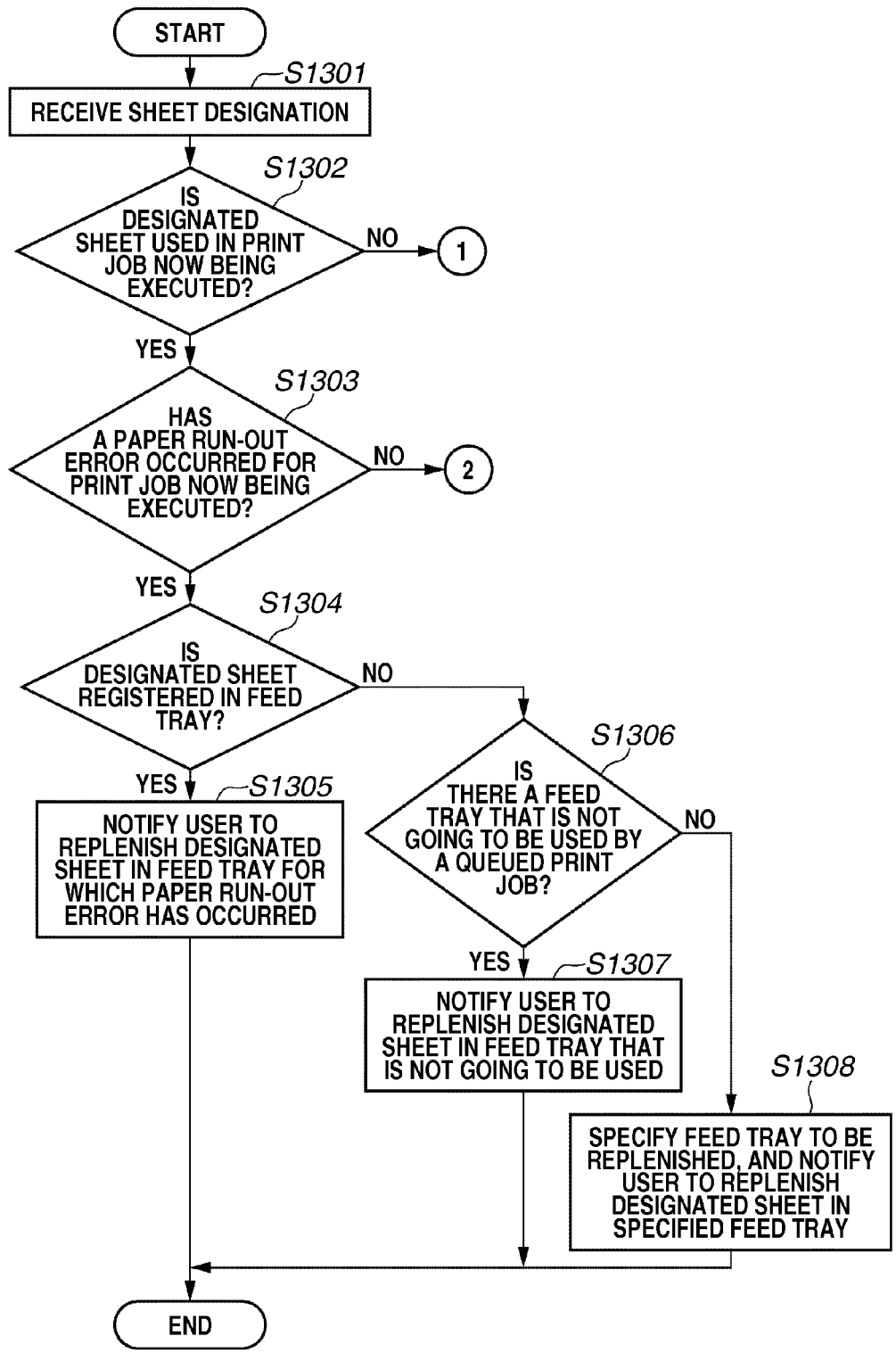
FIG. 13 is a flowchart illustrating a control method of the printing apparatus.
Figure 14:
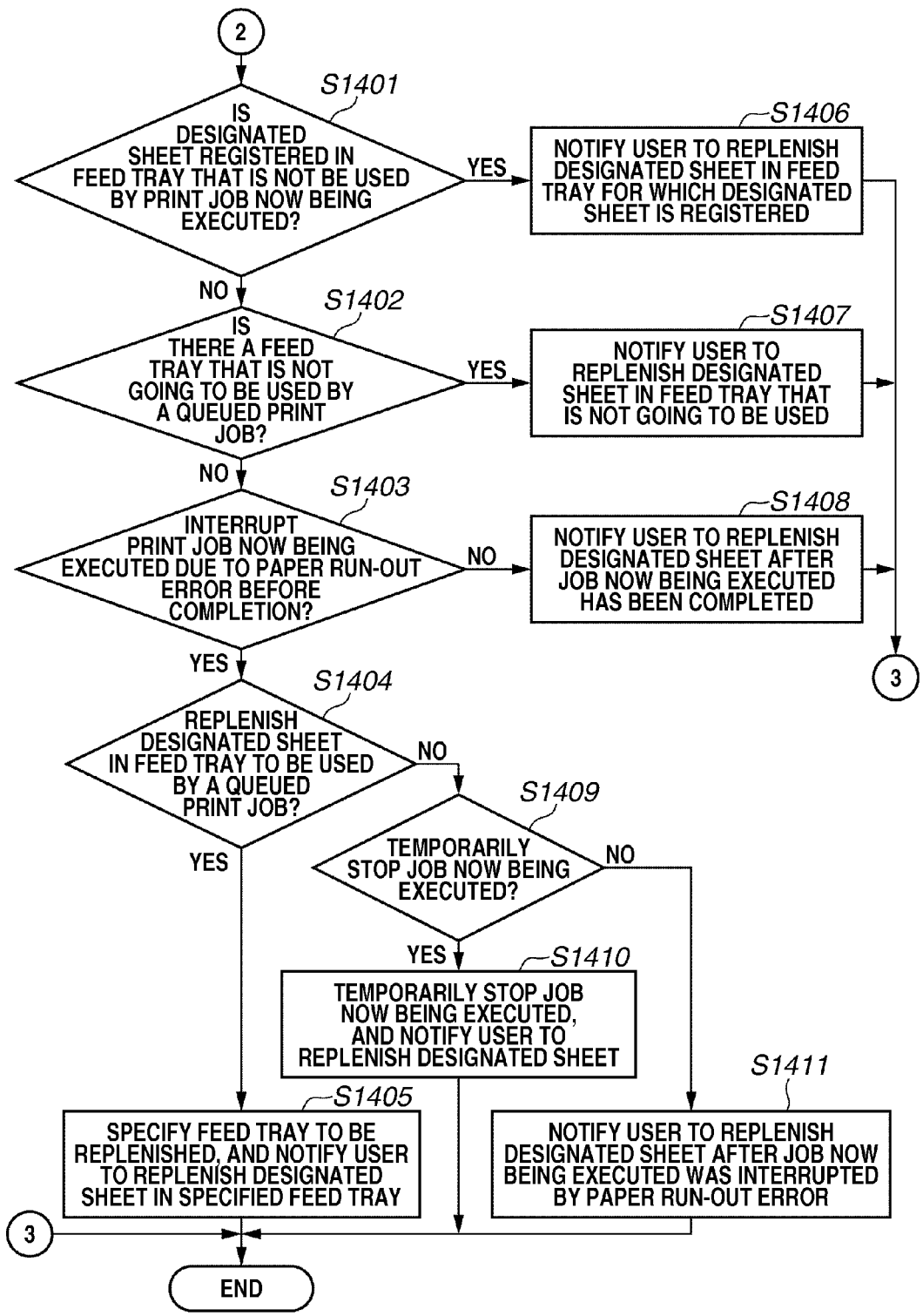
FIG. 14 is a flowchart illustrating a control method of the printing apparatus.
Figure 15:
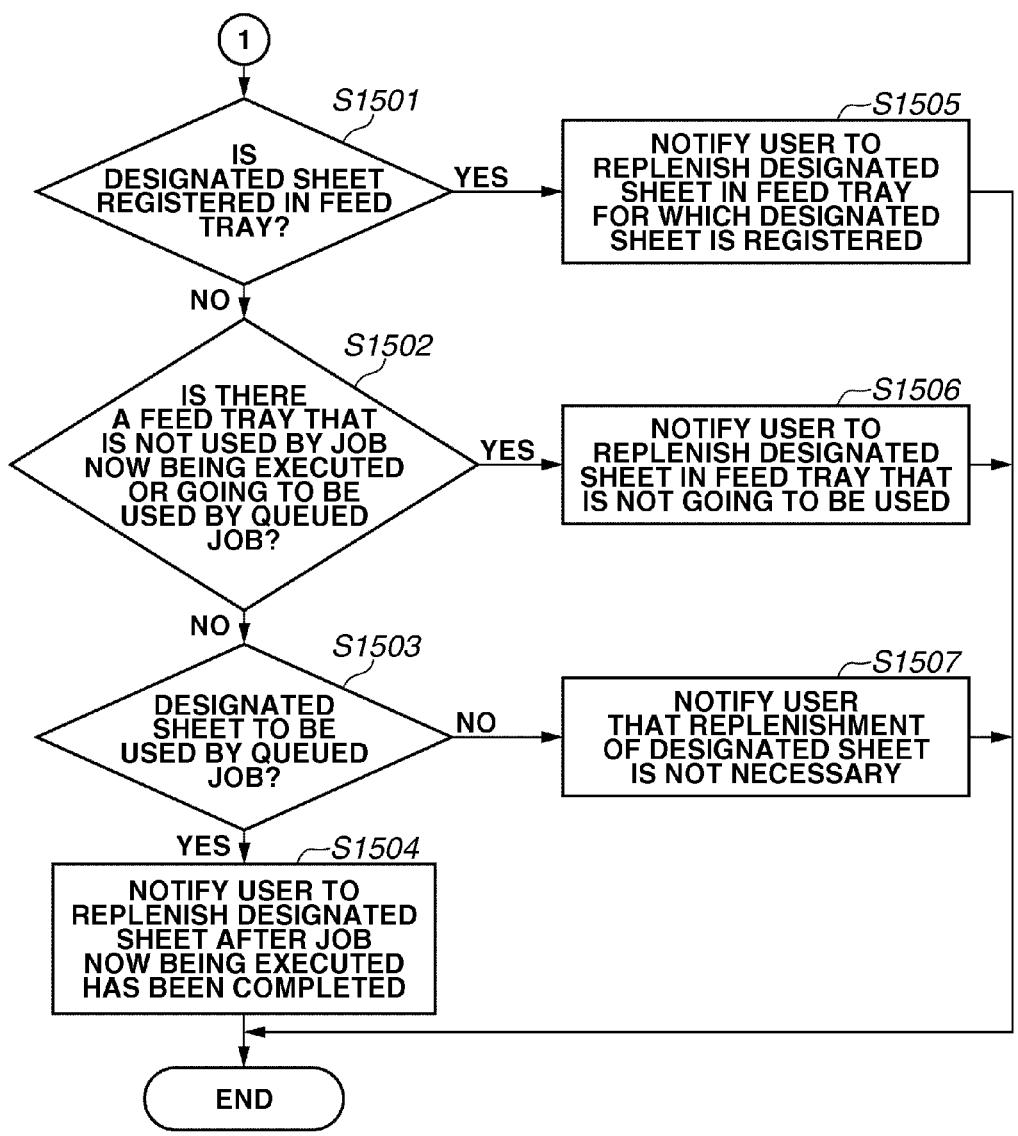
FIG. 15 is a flowchart illustrating a control method of the printing apparatus.

Next, the determination processing to determine the appropriate feed tray to be replenished with the type of sheet designated by the user will be described with reference to the flowcharts illustrated in FIGS. 13 to 15. Each step in FIGS. 13 to 15 is performed by the CPU 606 in the printing apparatus 101 opening and executing a program stored in a memory, such as the ROM 607.

First, in step S1301, the CPU 606 receives a designation of a specific type of sheet from the user. The designation of the specific type of sheet is input by the user via the screen illustrated in FIG. 10 that is displayed by touching the section 1102 or the button 1106. The sheet designated in this step indicates the sheet that the user wants to replenish. The specific type of sheet accepted in step S1301 will be referred to below as a designated sheet.

Next, in step S1302, the CPU 606 determines whether the designated sheet accepted in step S1301 is the sheet to be used in the print job now being executed. Referring to FIG. 11 as an example, if the designated sheet is the "A4 plain paper" to be used in the job 1, the CPU 606 determines that the designated sheet is the sheet used in the print job now being executed (YES in step S1302), and the processing proceeds to step S1302. On the other hand, if the designated sheet is not "A4 plain paper", the CPU 606 determines that the designated sheet is not the sheet used in the print job now being executed (NO in step S1302), and the processing proceeds to step S1501 illustrated in FIG. 15. The processing performed in steps from S1501 onwards will be described in detail with reference to FIG. 15.

Next, step S1303 will be described. In steps S1303 to S1308, the designated sheet is the sheet used in the print job now being executed. In step S1303, the CPU 606 determines whether the print job now being executed is stopped due to a paper out error. If it is determined by the CPU 606 that the print job now being executed is stopped due to a paper out error (YES in step S1303), the processing proceeds to step S1304. On the other hand, if it is determined that the print job now being executed is not stopped due to the paper out error (NO in step S1303), the processing proceeds to step S1401 illustrated in FIG. 14. The processing performed in steps from S1401 onwards will be described in detail with reference to FIG. 14.

Next, step S1304 will be described. In step S1304, since the designated sheet is the sheet used in the print job now being executed, and the print job now being executed is stopped due to the paper out error, it is desirable to quickly replenish the apparatus with the designated sheet. In step S1304, the CPU 606 determines whether the designated sheet is registered in (stored in) any of the feed trays included in the printing apparatus 101. In the present exemplary embodiment, if the designated sheet is registered in any of the feed trays corresponding to buttons 903 to 909 on the screen illustrated in FIG. 9, the CPU 606 determines that the designated sheet is registered in one of the feed trays included in the printing apparatus 101 (YES in step S1304), and the processing proceeds to step S1305. If it is determined in step S1304 that the designated sheet is registered in one of the feed trays, then the feed tray in which the designated sheet is registered is the feed tray for which the paper out error has occurred.

Figure 12A:
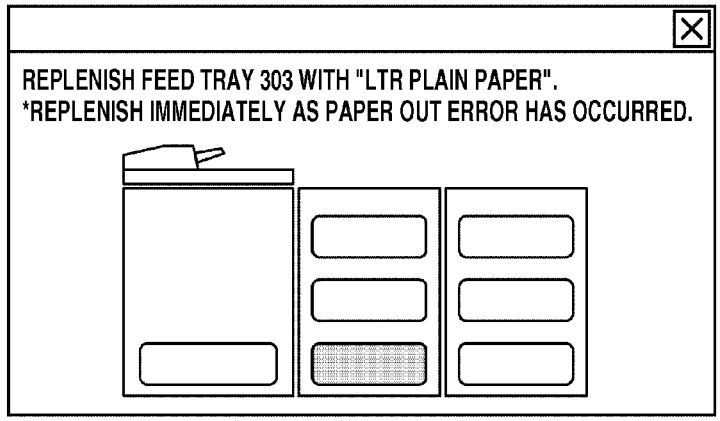
FIGS. 12A, 12B, and 12C illustrate user interface screens displayed by a printing apparatus.

In step S1305, the CPU 606 notifies the user to replenish the feed tray to which the designated sheet is registered, with the designated sheet. For example, if the designated sheet is "LTR plain paper", and the sheets are registered in the respective feed trays as illustrated in FIG. 9, the CPU 606 notifies the user to replenish the feed tray 303 corresponding to button 906, with "LTR plain paper". This notification is realized by the operation unit 614 displaying the screen illustrated in FIG. 12A. In FIG. 12A, the fact that a paper out error has occurred is also notified to the user.

On the other hand, in step S1304, if it is determined by the CPU 606 that the designated sheet is not registered in any of the feed trays included in the printing apparatus 101 (NO in step S1304), the processing proceeds to step S1306. In step S1306, the CPU 606 determines whether there are any feed trays that are not going to be used by a queued print job. In the present exemplary embodiment, if there are any feed trays in which a sheet that is not going to be used by a queued print job is registered, the CPU 606 determines that there is a feed tray that is not going to be used by a queued print job (YES in step S1306), and the processing proceeds to step S1307.

In step S1307, the CPU 606 notifies the user to replenish the feed tray that is not going to be used by a queued print job with the designated sheet. For example, if the designated sheet is "A4 thin paper", and the sheet that is not going to be used by a queued print job is registered in the feed tray 417, the CPU 606 notifies the user to replenish the feed tray 417 with "A4 thin paper" (displays a similar screen to that illustrated in FIG. 12A). If the designated sheet is replenished in a feed tray in which a sheet that is going to be used by a queued print job is registered, when the queued print job is executed, that print job will stop due to a paper out error. Through the processing of step S1307, this problem can be resolved. Further, if there is a plurality of feed trays that are not going to be used by a queued print job, the CPU 606 notifies the user to replenish the feed tray having the smallest sheet remaining amount with the designated sheet. Consequently, the user can reduce work when removing the sheets stored in the feed tray to be replenished with the designated sheet.

On the other hand, in step S1306, if it is determined that there are no feed trays in which a sheet that is not going to be used by a queued print job is registered, the CPU 606 determines that there are no feed trays that are not going to be used by a queued print job (NO in step S1306), and the processing proceeds to step S1308. In step S1308, the CPU 606 specifies the feed tray to be replenished with the designated sheet, and notifies the user to replenish the specified feed tray with the designated sheet (displays a similar screen to that illustrated in FIG. 12A). In the present exemplary embodiment, although the feed tray having the smallest sheet remaining amount among all of the feed trays is specified as the feed tray to be replenished, an exemplary embodiment is not limited to this. As another example, the user may be notified to replenish the feed tray used by the print job that is to be executed last among the queued print jobs with the designated sheet.

Next, FIG. 14 will be described. The processing illustrated in FIG. 14 is executed when it is determined that the designated sheet is used by the print job now being executed (YES in step S1302), and that the print job now being executed is not stopped due to a paper out error (NO in step S1303).

Figure 12B:
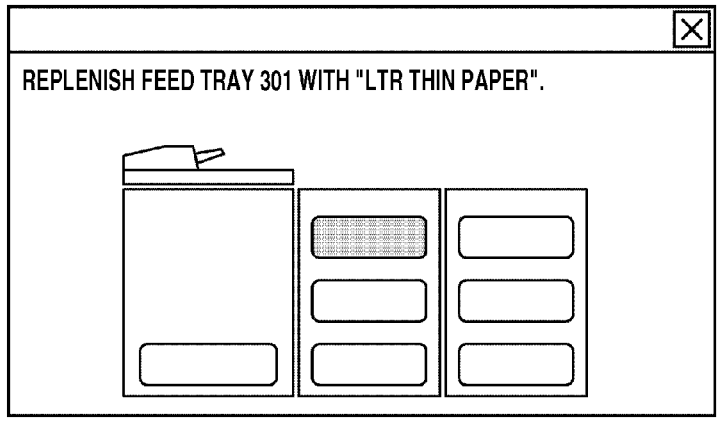

In step S1401, the CPU 606 determines whether the designated sheet is registered in a feed tray that is not used by the print job now being executed. If it is determined in step S1401 that the designated sheet is registered in a feed tray that is not used by the print job now being executed (YES in step S1401), the processing proceeds to step S1406. In step S1406, the CPU 606 notifies the user to replenish the feed tray in which the designated sheet is registered with the designated sheet. This notification is realized by the operation unit 614 displaying the screen illustrated in FIG. 12B. FIG. 12B illustrates a screen that is displayed when, for example, the designated sheet is "LTR thin paper", and the sheets are registered in the respective feed trays as illustrated in FIG. 9. On the other hand, if it is determined in step S1401 that the designated sheet is not registered in a feed tray that is not used by the print job now being executed (NO in step S1401), the processing proceeds to step S1402.

In step S1402, the CPU 606 determines whether there are any feed trays that are not going to be used by a queued print job. If if it is determined by the CPU 606 that there is a feed tray that is not going to be used by a queued print job (YES in step S1402), the processing proceeds to step S1407. In step S1407, the CPU 606 notifies the user to replenish the feed tray that is not going to be used by a queued print job with the designated sheet (displays a similar screen to that illustrated in FIG. 12B). If there is a plurality of feed trays that are not going to be used by a queued print job, the CPU 606 notifies the user to replenish the feed tray having the smallest sheet remaining amount with the designated sheet. On the other hand, in step S1402, if it is determined by the CPU 606 that there are no feed trays that are not going to be used by a queued print job (NO in step S1402), the processing proceeds to step S1403.

In step S1403, the CPU 606 determines whether to interrupt the print job now being executed before completion due to a paper out error. This determination is performed based on the print job execution schedule illustrated in FIG. 11. In step S1403, if it is determined by the CPU 606 not to interrupt the print job now being executed before completion due to a paper out error (NO in step S1403), the processing proceeds to step S1408.

Figure 12C:
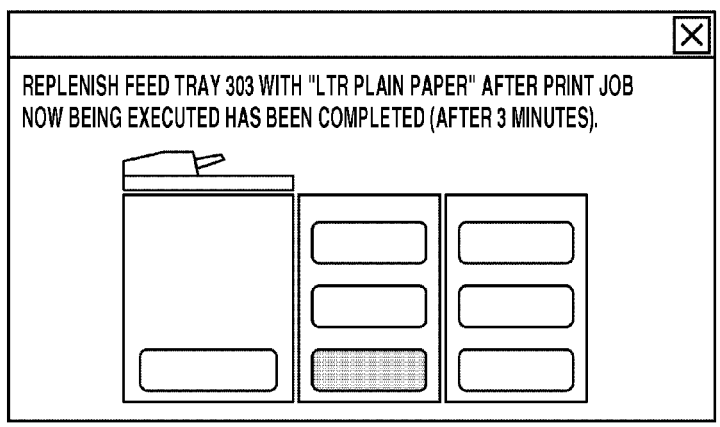

In step S1408, the CPU 606 notifies the user to replenish the feed tray that is used by the print job now being executed with the designated sheet after the print job now being executed has been completed. This notification is realized by the operation unit 614 displaying the screen illustrated in FIG. 12C. On the screen illustrated in FIG. 12C, the user is also notified when the print job now being executed might be completed based on the print job execution schedule illustrated in FIG. 11. FIG. 12C illustrates a screen that is displayed when, for example, the designated sheet is "LTR plain paper", the sheets are registered in the respective feed trays as illustrated in FIG. 9, and the print job now being executed will be completed in 3 minutes time. In step S1408, since the print job now being executed is not interrupted before completion due to a paper out error, the CPU 606 waits until the job has been completed before notifying the user to replenish the designated sheet. Further, since the designated sheet is not replenished in the feed trays which are going to be used by a queued print job, stoppage due to the paper out error when executing the queued print jobs can be prevented.

Figure 16A:
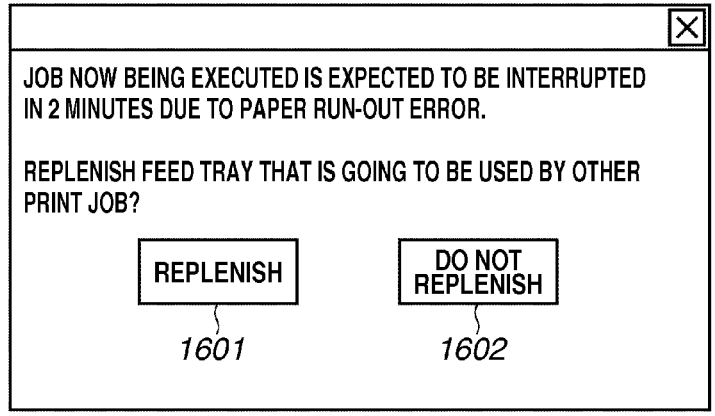
FIGS. 16A to 16E illustrate user interface screens displayed by a printing apparatus.

On the other hand, in step S1403, if it is determined by the CPU 606 to interrupt the print job now being executed before completion due to a paper out error (YES in step S1403), the processing proceeds to step S1404. In step S1404, the CPU 606 determines whether to replenish a feed tray that is going to be used by a queued print job with the designated sheet. This determination is executed when the operation unit 614 displays the screen illustrated in FIG. 16A, and it is determined whether the user selected button 1601 or button 1602. If the user selects the button 1601 on the screen in FIG. 16A, in step S1404, the CPU 606 determines to replenish a feed tray that is going to be used by a queued print job with the designated sheet, and the processing proceeds to step S1405.

Figure 16B:
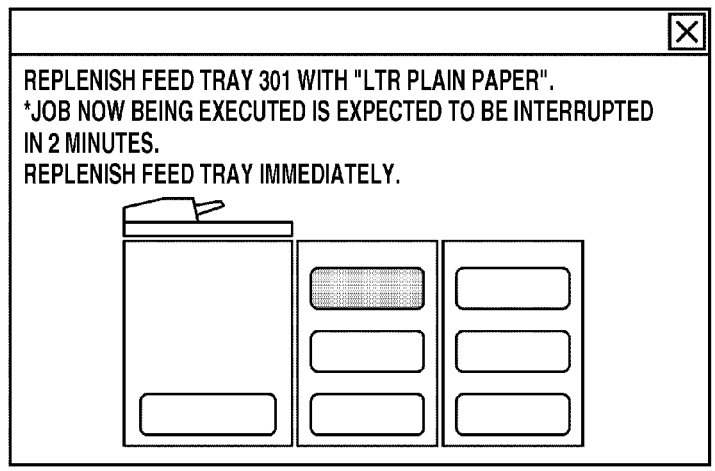

In step S1405, the CPU 606 specifies the feed tray to be replenished with the designated sheet, and notifies the user to replenish the specified feed tray with the designated sheet. This notification is performed by the operation unit 614 displaying the screen illustrated in FIG. 16B. In the present exemplary embodiment, although the feed tray having the smallest sheet remaining amount among the feed trays used by queued print jobs is specified as the feed tray to be preferentially replenished, the exemplary embodiment is not limited to this. Other examples may include notifying the user to replenish with the designated sheet the feed tray used by the print job that is to be executed last among the queued print jobs. FIG. 16B illustrates a screen that is displayed when the designated sheet is "LTR plain paper", and the feed tray having the smallest sheet remaining amount is specified as the feed tray 303. In step S1405, although there are no feed trays that are not going to be used by a queued print job, to prevent the print job now being executed from being stopped, the user is notified to replenish with the designated sheet a feed tray that is going to be used by a queued print job.

On the other hand, if it is determined in step S1404 not to replenish with the designated sheet a feed tray that is going to be used by a queued print job, the processing proceeds to step S1409. In the present exemplary embodiment, the processing proceeds to step S1409 when the user selects the button 1602 on the screen illustrated in FIG. 16A.

Figure 16C:
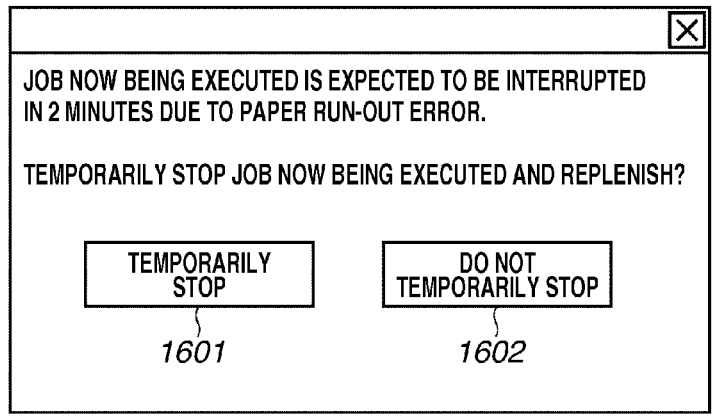

In step S1409, the CPU 606 determines whether to temporarily stop the print job now being executed and replenish the designated sheet. This determination is executed when the operation unit 614 displays the screen illustrated in FIG. 16C, and it is determined whether the user selected button 1621 or button 1622. If the user selected button 1621 on the screen in FIG. 16C, in step S1409, the CPU 606 determines to temporarily stop the print job now being executed and replenish the designated sheet, and the processing proceeds to step S1410. On the other hand, if the user selected button 1622 on the screen in FIG. 16C, in step S1409, the CPU 606 determines not to temporarily stop the print job now being executed and replenish the designated sheet, and the processing proceeds to step S1411.

Figure 16D:
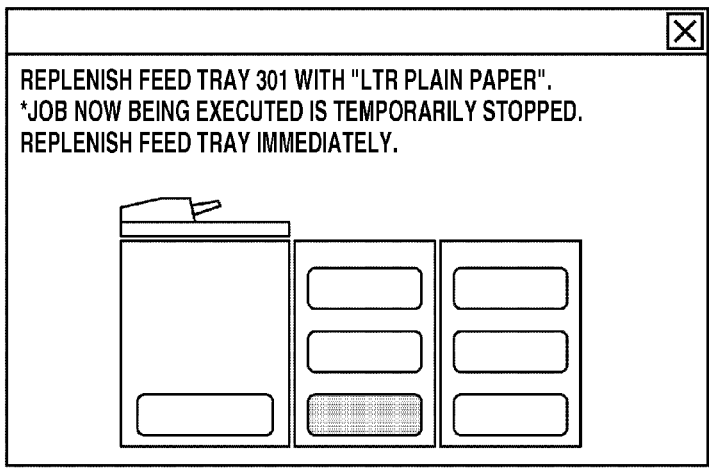

In step S1410, the CPU 606 temporarily stops the print job now being executed, and notifies the user to replenish with the designated sheet the feed tray that is used by the print job now being executed. This notification is realized by the operation unit 614 displaying the screen illustrated in FIG. 16D. When the user has replenished the designated sheet, the temporarily-stopped print job is restarted. FIG. 16D illustrates a screen that is displayed when the designated sheet is "LTR plain paper", and the feed tray used by the print job now being executed is the feed tray 301. In FIG. 16D, the user is also notified of the fact that the print job now being executed is temporarily stopped.

Figure 16E:
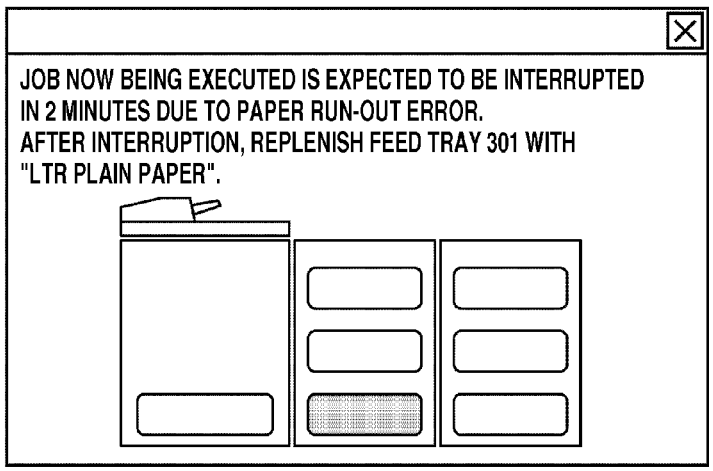

Next, step S1411 will be described. In step S1411, the CPU 606 interrupts the print job now being executed due to a paper out error, and then notifies the user to replenish the feed tray that is used by the print job now being executed, with the designated sheet. This notification is realized by the operation unit 614 displaying the screen illustrated in FIG. 16E. FIG. 16E illustrates a screen that is displayed when the designated sheet is "LTR plain paper", and the feed tray used by the print job now being executed is the feed tray 301. On the screen illustrated in FIG. 16E, the user is notified when the print job now being executed is interrupted due to a paper out error based on the print job execution schedule illustrated in FIG. 11.

Next, FIG. 15 will be described. The processing illustrated in FIG. 15 is executed when it is determined by the CPU 606 that the designated sheet is a sheet that is not used by the print job now being executed (NO in step S1302).

In step S1501, the CPU 606 determines whether the designated sheet is registered in (stored in) any of the feed trays included in the printing apparatus 101. In step S1501, the same determination is executed as performed in step S1304. If it is determined by the CPU 606 in step S1501 that the designated sheet is registered in one of the feed trays included in the printing apparatus 101 (YES in step S1501), the processing proceeds to step S1505. On the other hand, if it is determined by the CPU 606 in step S1501 that the designated sheet is not registered in any of the feed trays included in the printing apparatus 101 (NO in step S1501), the processing proceeds to step S1502.

In step S1505, the CPU 606 notifies the user to replenish the feed tray to which the designated sheet is registered with the designated sheet. This notification is realized by the operation unit 614 displaying a similar screen to that illustrated in FIG. 12B.

Next, step S1502 will be described. In step S1502, the CPU 606 determines whether there are any feed trays that are not used by the print job now being executed or not to be used by a queued print job. If if it is determined by the CPU 606 in step S1502 that there is a feed tray that is not used by the print job now being executed or not going to be used by a queued print job (YES in step S1502), the processing proceeds to step S1506. On the other hand, in step S1502, if it is determined by the CPU 606 that there are no feed trays that are not used by the print job now being executed or not to be used by a queued print job (NO in step S1502), the processing proceeds to step S1503.

In step S1506, the CPU 606 notifies the user to replenish with the designated sheet the feed tray that is not used by the print job now being executed or not to be used by a queued print job. This notification is realized by the operation unit 614 displaying a similar screen to that illustrated in FIG. 12B. If there is a plurality of feed trays that are not used by the print job now being executed or not to be used by a queued print job, the CPU 606 notifies the user to replenish with the designated sheet the feed tray having the smallest sheet remaining amount.

Next, step S1503 will be described. In step S1503, the CPU 606 determines whether the designated sheet is a sheet that is going to be used by a queued print job. Referring to FIG. 11 as an example, if the designated sheet is a sheet that is used in any of the job 2, the job 3, or the job 4, in step S1503, the CPU 606 determines that the designated sheet is a sheet that is going to be used by a queued print job (YES in step S1503), and the processing proceeds to step S1504. On the other hand, if the designated sheet is not used in any of the job 2, the job 3, or job 4, in step S1503, the CPU 606 determines that the designated sheet is not a sheet that is going to be used by a queued print job (NO in step S1503), and the processing proceeds to step S1507.

In step S1504, the CPU 606 notifies the user to replenish with the designated sheet the feed tray that is used by the print job now being executed after the print job now being executed has been completed. This notification is realized by the operation unit 614 displaying a similar screen to that illustrated in FIG. 12C. Although here the designated sheet is a sheet that is going to be used by a queued print job, since there are no feed trays that can be immediately replenished with the designated sheet (there are no feed trays that are not being used by the print job now being executed, or that are not going to be used by a queued print job), the CPU 606 waits until the queued print job has been completed before notifying the user to replenish with the designated sheet the feed tray used by the print job now being executed.

Figure 17:
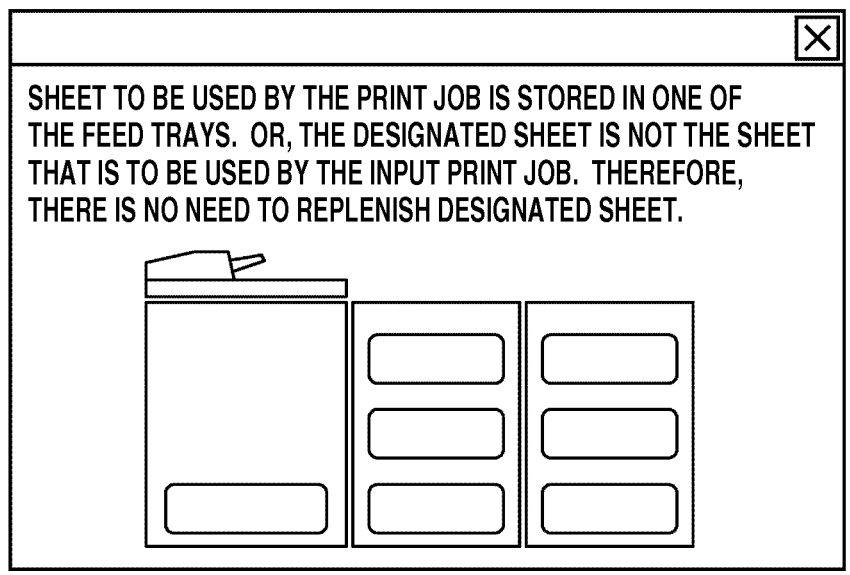
FIG. 17 illustrates a user interface screen displayed by a printing apparatus.

Next, step S1507 will be described. In step S1507, since the designated sheet is not a sheet that is going to be used by a queued print job, and since there are no feed trays that are not used by the print job now being executed or are not going to be used by a queued print job, the need to replenish the designated sheet in the printing apparatus 101 is likely to be low. In the present exemplary embodiment, in consideration of this, in step S1507, the CPU 606 notifies the user that it is not necessary to replenish the designated sheet. This notification is realized by the operation unit 614 displaying the screen illustrated in FIG. 17.

Even if the designated sheet is not a sheet that is used by the print job now being executed or going to be used by a queued print job, if there are feed trays that are not used by the print job now being executed or not going to be used by a queued print job, in step S1506, the CPU 606 notifies the user to replenish with the designated sheet the feed tray that is not used by the print job now being executed or not going to be used by a queued print job. That is, according to the present exemplary embodiment, when the designated sheet is not a sheet that is used by the print job now being executed or going to be used by a queued print job, based on whether there is a feed tray that is not used by the print job now being executed or not going to be used by a queued print job, the user is either notified or not notified to replenish the designated sheet.

Thus, according to the present exemplary embodiment, the feed tray to be replenished with the designated sheet specified by the user for replenishment can be determined based on the type of sheet that is used by the print job now being executed or going to be used by a queued print job, and the type of sheets that are stored in each feed tray.

Further, while the present exemplary embodiment is described based on an example in which the various screens are displayed on the operation unit 614 of the printing apparatus 101, the various screens may be displayed on the screen 702 of the information processing apparatus 102 or on a mobile terminal that the user has. During such an operation, the information required to display the screens is transmitted to the information processing apparatus 102 or the mobile terminal from the printing apparatus 101 via the network 103 or a wireless local area network (LAN) (not illustrated).

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-091139 filed Apr. 12, 2012, which is hereby incorporated by reference herein in its entirety.

What is claimed is:

1. A printing apparatus comprising:
   a plurality of sheet holding units;
   a storing unit configured to store information about an association between a sheet holding unit and a type of sheet for each of the plurality of sheet holding units;
   a reception unit configured to receive a designation of a type of sheet from a user;
   selecting unit configured to select, from among the plurality of sheet holding units, a sheet holding unit in which a sheet of the type of sheet corresponding to the designation received by the reception unit is to be set, based on the information stored by the storing unit, a type of a sheet that is used by a print job now being executed in the printing apparatus, and a type of a sheet that is going to be used by a queued print job in the printing apparatus; and
   a notification unit configured to notify the user to set a sheet of the type of sheet corresponding to the designation received by the reception unit in the sheet holding unit selected by the selecting unit.

2. The printing apparatus according to claim 1, wherein the selecting unit is configured to select a sheet holding unit being different from a sheet holding unit in which a sheet that is used by the print job now being executed is set, as a sheet holding unit in which a sheet of the type of sheet corresponding to the designation received by the reception unit is to be set.

3. The printing apparatus according to claim 2, wherein the selecting unit is configured to select a sheet holding unit being different from the sheet holding unit in which a sheet that is used by the print job now being executed is set and being different from a sheet holding unit in which a sheet that is going to be used by the queued print job is set, as a sheet holding unit in which a sheet of the type of sheet corresponding to the designation received by the reception unit is to be set.

4. The printing apparatus according to claim 1, wherein the selecting unit is configured to, if the type of sheet corresponding to the designation received by the reception unit is a type of a sheet set in a sheet holding unit for which a paper out error has occurred, select the sheet holding unit for which the paper out error has occurred, as a sheet holding unit in which a sheet of the type of sheet corresponding to the designation received by the reception unit is to be set.

5. The printing apparatus according to claim 1, wherein the selecting unit is configured to, if a sheet of the type of sheet corresponding to the designation received by the reception unit is set in any of the plurality of sheet holding units, select the sheet holding unit in which the sheet of the type of sheet corresponding to the designation received by the reception unit is set, as a sheet holding unit in which a sheet of the type of sheet corresponding to the designation received by the reception unit is to be set.

6. The printing apparatus according to claim 1, wherein the selecting unit is configured to preferentially select a holding unit having a low remaining amount of sheets, as a sheet holding unit in which a sheet of the type of sheet corresponding to the designation received by the reception unit is to be set.

7. A method for controlling a printing apparatus that includes a plurality of sheet holding units, the method comprising:
   storing information about an association between a sheet holding unit and a type of sheet for each of the plurality of sheet holding units;
   receiving a designation of a type of sheet from a user;
   selecting, from among the plurality of sheet holding units, a sheet holding unit in which a sheet of the type of sheet corresponding to the designation received is to be set, based on the information stored by the storing unit, a type of a sheet that is used by a print job now being executed in the printing apparatus, and a type of a sheet that is going to be used by a queued print job in the printing apparatus; and
   notifying the user to set a sheet of the type of sheet corresponding to the designation received in the selected sheet holding unit.

8. A non-transitory storage medium in which a program is stored that makes a computer execute a method for controlling a printing apparatus that includes a plurality of sheet holding units, the method comprising:

storing information about about an association between a sheet holding unit and a type of sheet for each of the plurality of sheet holding units;

receiving a designation of a type of sheet from a user;

selecting, from among the plurality of sheet holding units, a sheet holding unit in which a sheet of the type of sheet corresponding to the designation received is to be set, based on the information stored by the storing unit, a type of a sheet that is used by a print job now being executed in the printing apparatus, and a type of a sheet that is going to be used by a queued print job in the printing apparatus; and notifying the user to set a sheet of the type of sheet corresponding to the designation received in the selected sheet holding unit.

* * * * *